Figure 1:
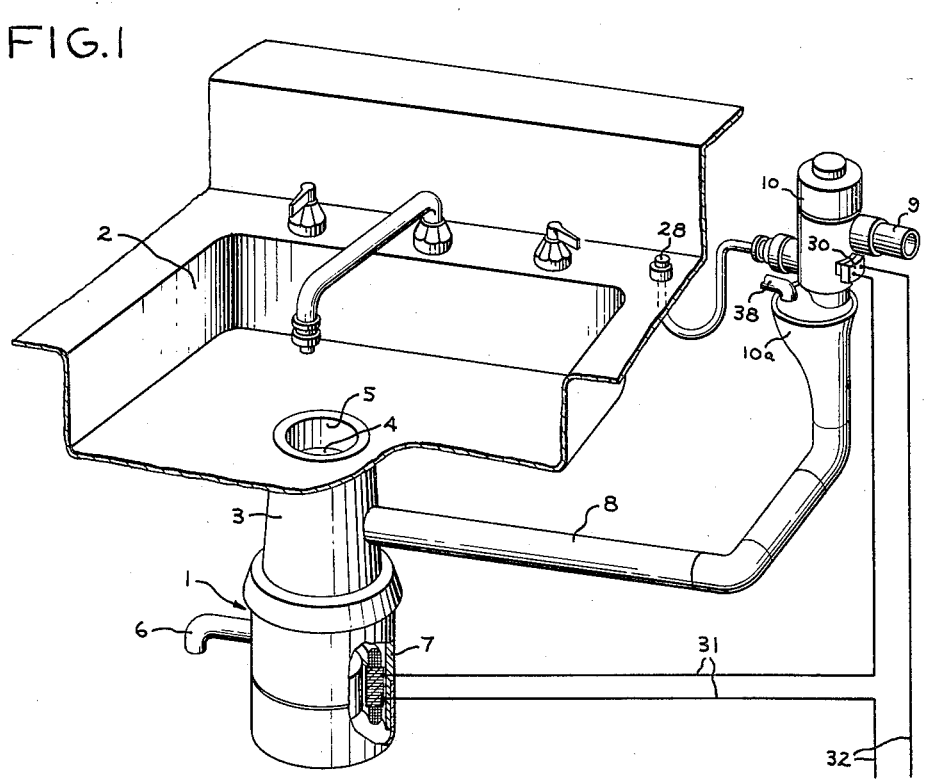

May 15, 1962      L. W. GUTH      3,034,734

WASTE DISPOSAL APPARATUS

Filed Dec. 22, 1960

INVENTOR.
LAUREN W. GUTH
BY
HIS ATTORNEY

United States Patent Office 3,034,734
Patented May 15, 1962

3,034,734
WASTE DISPOSAL APPARATUS
Lauren W. Guth, Louisville, Ky., assignor to General
Electric Company, a corporation of New York
Filed Dec. 22, 1960, Ser. No. 77,608
4 Claims. (Cl. 241—36)

This invention relates to waste disposal apparatus, more particularly of the kind wherein garbage and other kitchen wastes are comminuted in the presence of water into a flowable mixture and the resultant mixture flushed to the waste disposal system as for example the sink drain, and it has for its object the provision of manually controllable means for starting the comminuting operation and for automatically terminating this operation, and also of means for insuring the flow of an adequate supply of water to the apparatus during the entire operation of comminuting the waste material.

With regard to the objective of this invention of insuring an adequate flow of water, in the operation of waste disposal apparatus of the kind referred to, a generous flow of water is necessary to facilitate reduction of the waste materials to proper flowable state for passage through the apparatus, and to act as a carrier for flushing comminuted material to the sewer or other receiving means. If an adequate flow is not provided there may arise troubles such as retardation or blocking of moving parts of the comminuting mechanism so as to retard the elimination process, clogging of the apparatus, and, under some conditions, clogging in the drain line. This invention insures an adequate flow of water throughout the entire comminuting operation.

The further objective of effecting waste disposal apparatus which may be started by a manual control and which automatically stops adds to the convenience in use of the apparatus in that it is merely necessary to start the comminuting operation following which the apparatus will go through a comminuting operation and then automatically stop. The attention of the operator is not needed after the comminuting operation has been initiated.

In accordance with one aspect of this invention, I provide a comminuting apparatus provided with a comminuting housing having comminuting means therein, and power means such as an electric motor for driving the comminuting means. The housing is provided with a drain line to which comminuted material is discharged, and a water supply line. Connected in the supply line for the purpose of controlling the flow of water to the housing is an automatic valve of the so-called flush-type arranged so that when an actuator is operated it opens to allow water to flow to the housing and thereafter automatically closes. This automatic valve further controls the operation of the power means so that substantially coincident with the start of the water flow to the housing, the power means is controlled to operate the comminuting means, and further is controlled to operate the comminuting means as long as the valve is open to supply water, and finally to stop the comminuting operation when the valve closes to shut off the flow of water to the apparatus, or preferably to stop the comminuting operation shortly before the valve shuts off the water flow.

Figure 2:
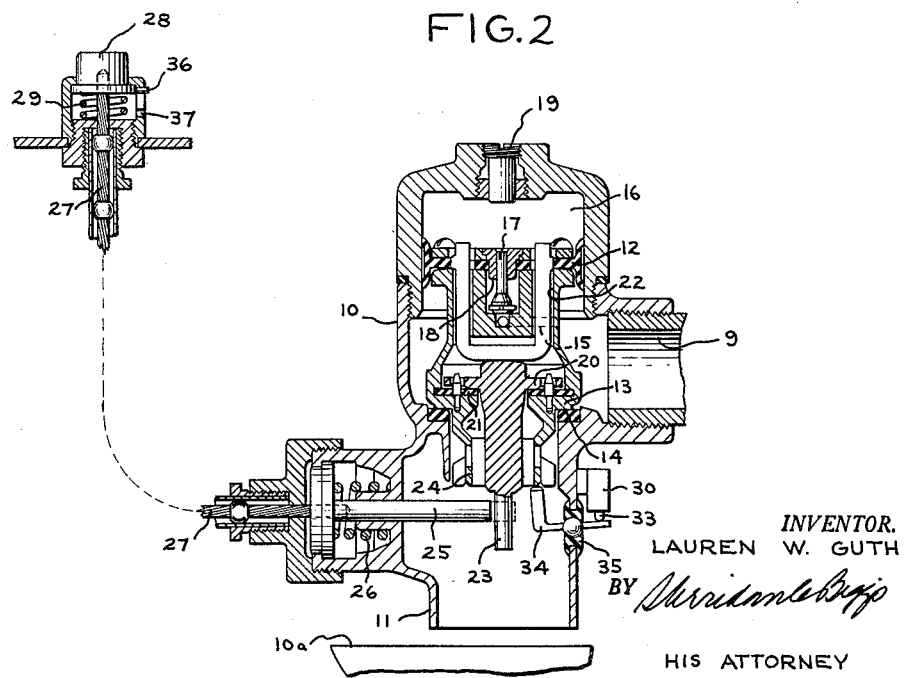

For a better understanding of this invention, reference may be had to the accompanying drawing in which:

FIG. 1 shows in perspective and partially cut away, an exemplary form of waste disposal apparatus embodying this invention; and FIG. 2 is a vertical sectional view in a larger scale than FIG. 1 of water flow control means and control means for the power operating means provided to drive the apparatus of FIG. 1.

Referring to the drawing this invention has been shown in one form as applied to waste disposal apparatus 1 intended to be used in connection with a kitcehn sink 2. The disposal apparatus 1 is provided with a tubular comminuting housing 3 providing a comminuting chamber including grinding or comminuting mechanism (not shown) in the lower portion thereof and an open upper end 4. This opening communicates with the sink through the sink drain opening 5. The comminuting mechanism may be of any suitable construction for example that disclosed in the United States Patent to H. J. Macemon—2,823,083, dated March 25, 1958, and assigned to General Electric Company, the assignee of this application. The apparatus 1 is provided with a drain line 6 for receiving comminuted material from the apparatus and discharging it to the household sewer system for example. The comminuting mechanism is driven by a suitable electric motor 7.

The garbage and other materials to be disposed of are inserted into the housing 3 through its upper opening 4, and it is comminuted by the comminuting means by operating the latter by energizing the driving motor 7. During the comminuting operation water is flowed into the housing 3, the water flow assisting in the comminuting operation and mixing with the comminuted material to form a flowable mixture which is discharged through the drain line 6.

Water is supplied from a water line 8 connected with the upper part of the housing 3 and connected with a source of water supply pipe 9 through a water control flush valve 10. Preferably the valve 10 will deliver water to the line 8 through an air gap designed to prevent any possibility of water backflow from the unit 1 to the supply line 9. This air gap may be, and as shown is, provided by causing the valve 10 to discharge into a funnel-like enlargement 10a connected in the pipe 8. The mount of the funnel 10a will be located above the flood level of the sink 2.

The flush valve 10 may be of any suitable construction which upon being actuated to open the supply line to water flow will pass a quantity of water in a timed interval and then will close automatically; for example the flush valve element disclosed in the United States Patent to I. H. Russell—2,633,141, dated March 31, 1953, may be used. This valve includes a hollow valve body 11 (FIG. 2) within which is a piston 12 which operates a valve 13. This valve 13 coacts with a valve seat 14 arranged with respect to supply source 9 so that when the piston is elevated it opens the valve to permit water to flow, whereas when the piston moves down it closes the valve seat to stop the flow of water. The piston 12 is provided with a bypass passage 15 to permit water to flow from the source 9 to the chamber 16 above the piston and hold the valve closed due to the pressure differential between the upper and lower sides of piston 12. A bypass pin 17 is adapted to close by water pressure upon the small bypass opening 18 leading into the upper chamber 16 whenever the piston moves down toward its seat 14 to time the closing operation. An adjustment screw 19 is provided to adjust the stroke of the piston 12 and therefore the volume of water passing through the valve. Located within the piston 12 is a relief valve 20 which is arranged to release the pressure in chamber 16 whenever the valve 20 is tilted from engagement with its seat 21 in the bottom of the piston, the tilting motion opening the seat to allow water to flow down through openings 22 in the piston from chamber 16 into housing 11 below valve 13. The relief valve has a depending operating stem 23 rigidly secured to the valve, rather than through a sleeve in which it slides as shown in the aforementioned Russell patent. Around the stem 23 is a valve guide barrel 24. A plunger 25 is provided for tilting the valve 20 from its seat upon being pressed inwardly to dotted line position shown in FIG. 2; it is held in an outer or retracted position by compression spring 26. The plunger is moved inwardly against the spring 26 to tilt the valve 20 by means of a flexible cable 27 leading from the valve 10 to a point readily accessible at the sink 2 where a manually operable pushbutton 28 is provided. This button when depressed momentarily against the force of spring 29 will move the plunger 25 inwardly to tilt valve 20 to release the pressure in chamber 16 and when this occurs the piston 12 will rise to open the valve 13, to allow water to flow through chamber 11 to supply line 8. When opened, water will "bleed" through bypass passages 15 and 18 to chamber 16 and so time the reclosing of the valve 13 and in doing so will allow a quantity of water to pass to the comminuting housing 3. It will be understood that when the button 28 is released, the spring 26 will withdraw the pin 25 from the downward path of movement of the valve stem 23.

At the same time the valve 13 is opened, the valve mechanism will effect the energization of the motor 7 to drive the comminuting mechanism. This is accomplished by a control switch 30 connected in the energizing circiut 31 of the motor to connect the motor with a suitable electrical supply source 32 when the valve is opened. The switch 30 may have any suitable construction but preferably will be of the type which is spring biased toward a closed position to close the circuit to the motor 7 and when closed depresses a pin 33 outwardly, that is, downwardly as viewed in FIG. 2. In other words, when the pin 33 is down the switch is closed and when pin 33 is depressed it opens the switch. Many switches of this kind may be found on the market.

The switch is actuated by an L-shaped actuating arm 34 pivotably mounted in a grommet 35 positioned in an aperture provided for it in housing 11 below the valve barrel 24 as shown in FIG. 2. The parts are so arranged that when the valve 13 is closed the barrel 26 engages the arm 34 so as to depress switch pin 33 to hold the switch 30 open so that the motor 7 is deenergized; but when the valve 13 opens, the barrel 24 is elevated to allow the switch 30 to close and thereby connect the motor 7 with the supply source 32.

In operation of the apparatus thus far described: when the garbage has been deposited in the housing 3 and it is desired to grind it, the button 28 is depressed and from that point on no further attention is required by the operator. The depression of this button activates the valve 10 to open by tilting the relief valve 20, as explained. The opening of the valve not only connects the housing 3 with the water supply 9, but also actuates the switch 30 to energize the motor 7. The motor 7 will drive the comminuting means to comminute the garbage the entire period during which the flush valve supplies water to the housing—and this will occur until the timed valve 13 recloses. Preferably, however, the valve barrel 24 will be related to the switch actuator arm 34 so that the switch 30 will be opened to stop the comminuting apparatus shortly, for example twelve to fifteen seconds, before the flow of water is completely shut off. This will allow a quantity of water to flow through the comminuting apparatus after the comminuting operation has stopped so as to flush out the apparatus and the drain line 6.

If desired the opening 4 at the top of housing 3 may be closed by a suitable stopper assembly and splash guard such as disclosed in the United States Patent to F. W. Moore—2,787,423, dated April 2, 1957, assigned to General Electric Company, the assignee of this application.

If desired, the button 28 may be provided with means for mechanically holding it down against the upward bias of the spring 29 so that the pin 25 will be held inwardly in its dotted line velve stem 23 operating position shown in FIG. 2. This will place the pin 25 in the downward path of movement of the valve stem 23 and thus will prevent the reclosing of the relief valve 20, and thereby continuously release the liquid pressure in chamber 16. This operation will prevent the timed closure of the valve 13 which will remain open until the button 28 is released, and so will effect a continuous operation of the comminuting apparatus with water flow as long as the button 28 is held in depressed position. Any suitable means may be used for holding button down, for example as shown in FIGURE 2 a bayonet-type lock may be used comprising a bayonet pin 36 movable in a bayonet slot 37 arranged so that when the button 28 is depressed and turned counterclockwise looking down upon it as viewed in the drawing, the button will be locked down, and is releasable by rotating it in the reverse direction.

It is understood often-times a dishwasher is used in the home as a companionate appliance with the comminuting apparatus 1. When this is done the discharge line of the dishwasher, identified in FIG. 1 by numeral 38, may feed into the apparatus 1 by causing the line 38 to discharge as shown into the funnel 10a; this, of course, also conveniently establishes an air gap to prevent water backflow from the dishwasher to the water supply line 9.

While I have shown and described a particular embodiment of my invention, I do not desire the invention to be limited to the particular construction disclosed, and I intend by the appended claims to cover all modifications within the true spirit and scope of my invention.

What I claim as new and desire to secure by Letters Patent of the United States is:

1. In combination, a waste disposal apparatus including a housing with means therein for comminuting material, and power means for operating said comminuting means, said housing having a drain line for the disposal of comminuted material, a water line for supplying water to said housing for aid in the disposal of comminuted material to said drain line, a flush valve in said water line for controlling the flow of water to said housing including an operating member which when operated effects the operation of said flush valve to complete a timed cycle of operation between open and closed positions thereby to provide for the flow of a quantity of water to said housing, a control element for said power means operable when in one position to cause said power means to operate said comminuting means and when in another to cause said power means to stop the operation of said comminuting means, and an operable connection between said control element and said valve to operate said element to said one operating position when said valve opens and to said other inoperative position when said valve moves to close.

2. In combination, a waste disposal apparatus including a housing with means therein for comminuting material and an electric motor for driving said comminuting means, said housing having a drain line for the disposal of comminuted material and a water supply line for supplying water to said housing for the disposal of comminuted material to said drain line, a flush valve in said water line comprising a control valve movable from a closed position in which it shuts off the flow of water to said housing and an open position in which it permits water to flow to the said housing, and also having means for regulating the movement of said valve from said open to said closed positions to time the flow and thereby control the quantity of water supplied to said housing, and said flush valve also having means for causing the operation of said valve to open including a control element manually operable to effect said operation of said valve, a switch controlling the energization of said motor operable when in one position to effect the energization of said motor to drive said comminuting means and when in another position to effect the deenergization of said motor to stop said comminuting means, and an operating member for said switch operably connected to be operated by said valve so that when the valve is opened said switch effects the energization of said motor to drive said comminuting means and when said valve is moved to close said switch effects the deenergization of said motor to stop the comminution operation.

3. The waste disposal apparatus specified in claim 1 wherein the operable connection between said control element and said valve effects the movement of said element to said other inoperative position to cause said power means to stop the comminuting operation at a time interval prior to the closure of said valve.

4. In combination, a waste disposal appartus including a housing with means therein for comminuting material and an electric motor for driving said comminuting means, said housing having a drain line for the disposal of comminuted material and a water supply line for supplying water to said housing for the disposal of comminuted material to said drain line, a flush valve in said water line comprising a control valve movable from a closed position in which it shuts off the flow of water to said housing and an open position in which it permits water to flow to the said housing, and also having means for regulating the movement of said valve from said open to said closed positions to time the flow and thereby control the quantity of water supplied to said housing, and said flush valve also having means for causing the operation of said valve to open including a control element manually operable to effect said operation of said valve by momentary movement from one position to a second position, and biasing means for biasing said element to return to said one position when it is released, a switch controlling the energization of said motor operable when in one position to effect the energization of said motor to drive said comminuting means and when in another position to effect the deenergization of said motor to stop said comminuting means, an operating member for said switch operably connected to be operated by said valve so that when the valve is opened said switch effects the energization of said motor to drive said comminuting means and when said valve is moved to close said switch effects the deenergization of said motor to stop the comminution operation, and means for locking at will said control element in said second position to control said flush valve to remain open to supply water continuously to said housing and control said switch to energize said motor continuously while said water is supplied.

References Cited in the file of this patent
UNITED STATES PATENTS

| | | |
|---|---|---|
| 1,968,515 | Cable et al. | July 31, 1934 |
| 2,044,548 | Schwennker | June 16, 1936 |
| 2,044,563 | Carter | June 16, 1936 |
| 2,044,564 | Carter | June 16, 1936 |
| 2,244,402 | Powers | June 3, 1941 |
| 2,414,964 | McPherson | Jan. 28, 1947 |
| 2,615,636 | Powers | Oct. 28, 1952 |
| 2,633,141 | Russell | Mar. 31, 1953 |